Feb. 12, 1957   P. H. DIXON   2,780,963
CARTRIDGE BELT LINK AND STRENGTH MEMBER THEREFOR
Filed March 17, 1955   2 Sheets-Sheet 1
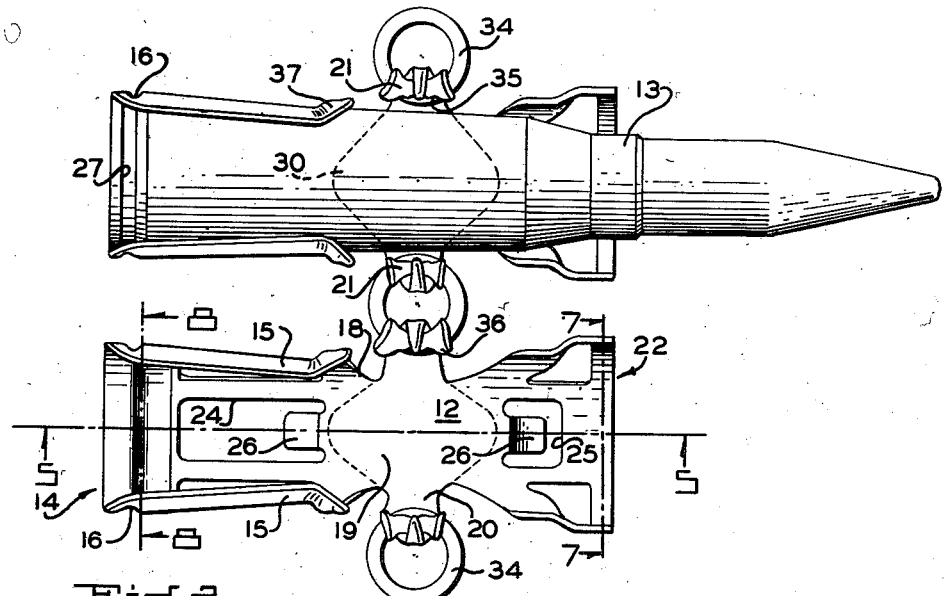
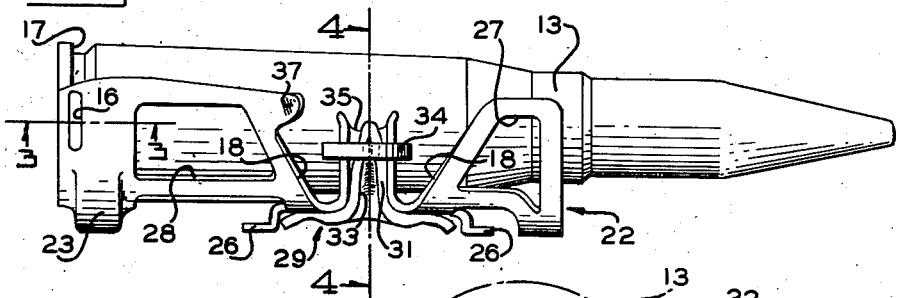
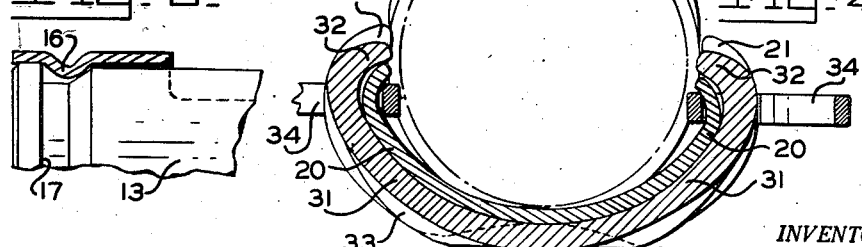
INVENTOR.
Paul H. Dixon
BY
W. E. Thibodeau & A. W. Dew
ATTORNEYS Feb. 12, 1957 P. H. DIXON 2,780,963
CARTRIDGE BELT LINK AND STRENGTH MEMBER THEREFOR
Filed March 17, 1955 2 Sheets-Sheet 2
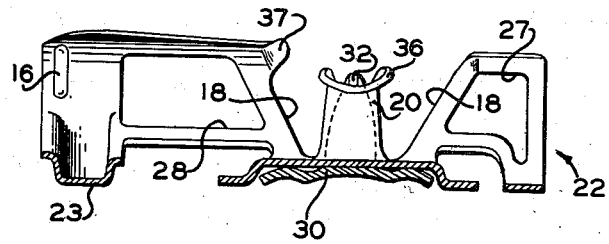
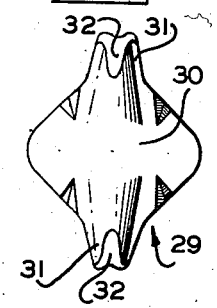
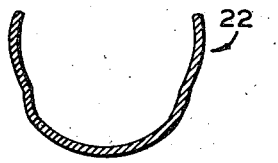
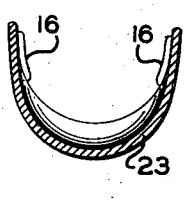
INVENTOR.
Paul H. Dixon
BY
W. E. Thibodeau + A. W. Dew
ATTORNEYS United States Patent Office 2,780,963
Patented Feb. 12, 1957

2,780,963
CARTRIDGE BELT LINK AND STRENGTH MEMBER THEREFOR

Paul H. Dixon, Rockford, Ill., assignor to the United States of America as represented by the Secretary of the Army Application March 17, 1955, Serial No. 495,072

4 Claims. (Cl. 89—35)

This invention relates to disintegrating ammunition belts for firearms and more particularly to those belts from which the cartridges are extracted for subsequent chambering by being pushed or rammed forwardly from the links respectively associated therewith.

Ammunition belts for modern rapid-fire weapons such as machine guns and aircraft cannon are generally formed by articulately connecting a plurality of identical links in each of which a cartridge is frictionally retained by the resiliency of the material from which the link is fabricated. In many aircraft installations, the containers for storing the ammunition are so located in relation to the feed throat of the firearm that the feeding travel of the belt involves considerable twisting and turning between adjacent links.

Accordingly, the optimum link design requires sufficient structural stiffness to prevent the twisting movements of the belt from working the cartridge endwise out of its proper position in the link. At the same time, however, the body of the link must be flexible enough to offer a minimum of resistance to the forward ramming of the cartridge therefrom. Prior art efforts to effect a suitable compromise between such opposing requirements have heretofore proven unsuccessful because of the necessity for providing a link of sufficient strength to adequately resist the extremely high belt pulls frequently encountered in aircraft and tank installations. Moreover, the wall thickness of the link body necessary to attain the desired strength level also produces an undesirable increase in weight which is especially detrimental in aircraft installations.

It is, therefore, an object of this invention to provide a flexible yet strong cartridge belt of the type wherein each link is joined to an adjacent link by a separate connector.

It is a further object of this invention to provide an improved cartridge belt link wherein the cartridge gripping flexibility thereof is not decreased by the structural rigidity necessary to provide a strong connection between adjacent links.

Still another object of this invention is to provide a cartridge belt wherein the structural rigidity of the connecting portions of adjacent links does not depend upon the thickness of the material from which the link is fabricated.

It is a specific object of the present invention to provide a superior light weight, flexible disintegrating cartridge belt link from which the cartridge is extracted by being rammed therethrough and which is also characterized by excellent resistance to helical twist and longitudinal belt pull.

The specific nature of the invention as well as other objects and advantages thereof will clearly appear from the description of a preferred embodiment as shown in the accompanying drawings in which:

Fig. 1 is a top plan view of a pair of adjacent cartridge belt links of the present invention with a cartridge removed from one of the links to show the interior thereof;

Fig. 2 is a side elevational view of a single link and a cartridge therein;

Fig. 3 is a fragmentary cross-sectional view taken along line 3—3 in Fig. 2 to show the cooperation between one of the cartridge-gripping detents of the link and the extraction groove of the cartridge;

Fig. 4 is a cross-sectional view taken along line 4—4 in Fig. 2 but shown on an enlarged scale;

Fig. 5 is a cross-sectional view taken vertically along line 5—5 of Fig. 1;

Fig. 6 is a bottom plan view of the strength member;

Fig. 7 is a cross-sectional view taken along line 7—7 in Fig. 1; and

Fig. 8 is a cross-sectional view taken along line 8—8 in Fig. 1.

Referring more particularly to the drawings, the cartridge belt link of the present invention comprises a generally semicylindrical body 12 fabricated from a single piece of sheet steel and formed to receive a conventionally tapered cartridge 13. Body 12 includes a rear cartridge-gripping portion 14 having forwardly converging sidewalls 15 of substantially greater taper than that presented by the corresponding case portion of cartridge 13. A pair of circumferentially elongated detents 16 are oppositely located adjacent the rear edge of cartridge-gripping portion 14 and are formed to project inwardly toward each other to engage in the circumferential extractor groove 17 provided at the rear end of cartridge 13 as best shown in Fig. 3. Sidewalls 15 extend forwardly so as to terminate substantially halfway along the case portion of the cartridge 13 and are slightly spread apart by the lesser taper of the case to effect a resilient engagement therebetween. If desired, the front lower corners of sidewalls 15 may be provided with outwardly turned protrusions 37 to prevent interference with the rearward relinking movement of a fired cartridge case 13.

Forwardly of sidewalls 15, body 12 is cut away at either side thereof as best indicated at 18 in Fig. 2 to leave an intermediate bridge portion 19 and a relatively narrow arm 20 projecting centrally from opposite sides thereof and formed to provide a substantially U-shaped channel-like cross-section. The semicylindrical contour of each arm 20 is of slightly greater diameter than the remainder of body 12 and, therefore, projects beyond the exterior periphery of cartridge-gripping portion 14. The terminal ends of arms 20 are reversed to bend inwardly toward each other as indicated at 21 and are arranged to terminate short of the walls of the cartridge 13 so as to leave a space therebetween as shown in Fig. 4.

The semicylindrical shape of body 12 continues forwardly of bridge portion 19 at substantially the same diameter as the rear end of cartridge-gripping portion 14 but terminates in a front end portion 22 of enlarged diameter for a purpose to be later shown. In order to insure proper stacking of the links in ammunition boxes and similar containers, cartridge-gripping portion 14 is arcuately grooved along the interior periphery adjacent the rear end thereof to form a raised rib portion 23 which projects outwardly therefrom to substantially the same extent as portion 22 at the front end of body 12. Cartridge-gripping portion 14 is provided with a longitudinally-extending, centrally-disposed slot 24 and the front end portion 22 of link body 12 is provided with a shorter but similarly disposed slot 25. Slots 24 and 25 are in longitudinal alignment with each other. The opposite sides of bridge portion 19 are provided with a tonguelike guide 26 which projects beyond the exterior periphery of body 12 and at the same time extends longitudinally in opposite directions along the openings defined by slots 24 and 25. Guides 26 are arranged to engage in a suitable track (not shown) in the feed mechanism of the firearm to prevent longitudinal movement of the link therein prior to and during the ramming of cartridge 13 therefrom.

The weight of the cartridge link may be further decreased by skeletonizing body 12 through the removal of substantial areas of metal from the front end portion 22, as shown at 27 and from the cartridge-gripping portion 14 as shown at 28.

While the gage thickness of the material from which the aforesaid link is fabricated provides an extremely light and flexible structure, it is below the minimum required to withstand the tensile and twisting forces normally encountered in feeding long belts of ammunition over the tortuous paths provided in many aircraft and tank installations. Accordingly, the present invention also contemplates the addition of a strength member 29 to reinforce that portion of the link which is subjected to these high-feeding stresses. Strength member 29 comprises a generally oval body 30 having a substantially triangular finger 31 projecting arcuately from opposite sides thereof. Fingers 31 are formed with approximately the same arcuate contour as arms 20 and are turned inwardly toward each other at the extremities thereof as shown at 32. Thus, when strength member 29 is positioned on link body 12 so that the maximum diameter portion of oval body 30 lies directly between guides 26, fingers 31 are disposed in parallelism with the channel portion of arms 20. However, inasmuch as the distance between the tips of fingers 31 is slightly less than the distance between opposite arms 20 at the point where terminal ends 21 thereof begin to bend inwardly toward each other, the assembly of strength member 29 to link body 12 will force fingers 31 to spread apart sufficiently so that the inwardly directed extremities 32 thereof will move beyond the interfering portions of arms 20. The recovery of fingers 31 is not entirely complete and, thus, the resiliency remaining therein insures a positive engagement between strength member 29 and link body 12. Alternately, the inward bending of the terminal ends of fingers 31 may be delayed until strength member 29 is properly positioned on link body 12. Thereafter, each finger 31 can be formed to follow the arcuate contour of the corresponding arm 20 and thereby insure a positive engagement therebetween. If desired, fingers 31 may be channeled as best indicated at 33 in order to insure a closer fit with arms 20.

The links are connected in adjacent relationship by a connector 34 which fits around one of arms 20 and leaves sufficient space to receive one of the arms on an adjacent link. While connector 34 is shown in the form of a ring it should be understood that other configurations can be employed as long as a sufficient opening is provided to loosely surround two adjacent arms 20. When a cartridge 13 is properly seated in link body 20, the space defined between the exterior periphery of the cartridge case and terminal ends 21 is less than the width of connector 34 and thereby prevents separation between adjacent links prior to the stripping of the cartridges 13 therefrom. In view of the fact that the separation of connector 34 could occur while the link was still within the confines of the feeding mechanism of the firearm and produce a jam of the moving parts thereof, the edge of the tip of terminal ends 21 of each arm 20 is recessed as shown at 35. Thus, once connector 34 has been placed on one of arms 20, the projecting corners formed by recess 35 are bent outwardly to form diverging ears 36 which are separated to a greater extent than the diameter of connector 34. As a result connector 34 is permanently but loosely retained on each link.

It is apparent from the foregoing that despite the flexibility and lightness of link body 12, strength member 29 greatly increases the rigidity of arms 20 while adding a comparatively small increase in weight to the entire link. The cooperation between the channellike construction of arms 20 of link body 12 and fingers 31 of strength member 29 creates a rigid structure which is considerably stronger than the sum of the strengths of both taken separately and is, therefore, capable of resisting both the twisting and tensile forces normally encountered in feeding long belts of ammunition through a path involving several sharp changes in direction. At the same time, cartridge-gripping portion 14 is extremely flexible and, therefore, offers very little resistance to the ramming of a cartridge 13 therethrough. As a result, the links of the present invention are particularly adapted for use in high-speed firearms of larger calibers.

Although a particular embodiment of the invention has been described in detail herein, it is evident that many variations may be devised within the spirit and scope thereof and the following claims are intended to include such variations.

I claim:

1. A cartridge belt link comprising a generally semi-cylindrical body adapted to resiliently engage a cartridge, a channeled arm extending arcuately from either side of said body to project slightly beyond the exterior periphery thereof, a strength member superimposed on the exterior of said link body between said channeled arms and having a finger portion projecting arcuately from either side thereof and arranged to respectively fit in said channeled arms, said fingers having inwardly turned terminal ends for resiliently engaging the ends of said arms to retain said strength member on said link body, and a connector member respectively engageable with each of said arms to connect the link to one adjacent thereto.

2. A cartridge belt link comprising a generally semi-cylindrical body having a forwardly tapering cartridge-gripping portion at the rear end thereof adapted to resiliently engage a cartridge, a pair of opposed detents within the interior of said cartridge-gripping portion adjacent the rear end thereof and arranged to engage in the circumferential extractor groove at the rear end of the cartridge to prevent relative longitudinal movement therebetween, an arm of channeled cross-section extending arcuately from either side of said body forwardly of said cartridge-gripping portion and arranged to project slightly beyond the exterior rear end periphery thereof, a strength member having an oval body and a relatively narrow finger projecting arcuately from opposite sides thereof to lie within said channel-shaped arms, said fingers having inwardly turned terminal ends for resiliently engaging the ends of said arms to retain said strength member on said link body, and a connector member loosely engageable with each of said arms for joining the link to the one adjacent thereto.

3. In a cartridge belt link, a generally semicylindrical body having a forwardly tapering cartridge-gripping portion at the rear end thereof, adapted to resiliently engage a cartridge, a front end portion of increased diameter, a channel-shaped arm extending arcuately from either side of said body intermediate said cartridge-gripping portion and said increased diameter front end portion, each of said arms being arranged to project outwardly beyond the exterior peripheries of said cartridge-gripping portion and said increased diameter front end portion and having the terminal ends thereof turned inwardly toward one another, a strength member having an oval body and a relatively narrow finger projecting arcuately from opposite ends thereof to lie within said corresponding channel-shaped arm, said fingers being of substantially triangular configuration terminating in inwardly turned ends for resiliently engaging the ends of said arms to retain said strength member on said link body, and a connector member loosely engageable with each of said arms for joining the link to the one adjacent thereto.

4. A cartridge belt consisting of a plurality of adjacent links formed of resilient sheet metal, each link comprising a generally semicylindrical body having a forwardly tapering cartridge-gripping portion at the rear end thereof adapted to resiliently engage a cartridge, a front end portion of increased diameter adapted to surround the front end of the case portion of the cartridge, a pair of spaced-apart guides projecting outwardly from said link body, a channel-shaped arm extending arcuately from either side of said body intermediate said guides and arranged to project outwardly beyond the exterior peripheries of said cartridge-gripping portion and said increased diameter front end portion, said arms having inwardly directed ends terminating slightly apart from the sides of the cartridge, a strength member having an oval body and a relatively narrow finger projecting arcuately from opposite sides thereof, said oval body arranged to lie between said guides on said link body with said projecting fingers disposed within said channel-shaped arms, said fingers having an arcuate channellike contour corresponding to that of said arms and having inwardly turned ends arranged to be resiliently spread apart during movement beyond the arcuate contour formed on said arms by the origin of said inwardly turned ends thereof whereby the complete recovery of said fingers is halted by said arms to insure positive engagement between said entire strength member and said link body, and a ringlike connector surrounding each of said arms and arranged to loosely receive an arm on an adjacent link and thereby provide an articulate connection therebetween, one of said arms on each link having outwardly diverging ears on the terminal corners provided by the channel-shaped construction thereof, the distance across the tips of said ears being of greater extent than the diameter of said ringlike connector to prevent disengagement from said arm.

References Cited in the file of this patent

UNITED STATES PATENTS 2,600,492    Dixon _____ June 17, 1952